United States Patent
Hall et al.

(10) Patent No.: US 10,271,272 B2
(45) Date of Patent: Apr. 23, 2019

(54) METHODS AND APPARATUS TO ESTIMATE APPLICATION DATA TRAFFIC CHARACTERISTICS TO CONDITION DATA COMMUNICATION CHANNELS

(71) Applicant: Apple Inc., Cupertino, CA (US)

(72) Inventors: Geoffrey R. Hall, San Jose, CA (US); Franco Travostino, San Jose, CA (US); Padmavathy Bhooma, San Jose, CA (US); Venkateswara Rao Manepalli, San Jose, CA (US); Sarma V. Vangala, San Jose, CA (US)

(73) Assignee: Apple Inc., Cupertino, CA (US)

(*) Notice: Subject to any disclaimer, the term of this patent is extended or adjusted under 35 U.S.C. 154(b) by 159 days.

(21) Appl. No.: 15/402,570

(22) Filed: Jan. 10, 2017

(65) Prior Publication Data
US 2017/0201460 A1    Jul. 13, 2017

Related U.S. Application Data

(60) Provisional application No. 62/277,414, filed on Jan. 11, 2016.

(51) Int. Cl.
*H04W 52/02* (2009.01)
*H04L 12/26* (2006.01)
*H04L 12/24* (2006.01)

(52) U.S. Cl.
CPC ......... *H04W 52/02* (2013.01); *H04L 41/0893* (2013.01); *H04L 41/147* (2013.01); *H04L 43/0876* (2013.01); *H04L 43/10* (2013.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/166* (2018.01); *Y02D 70/23* (2018.01); *Y02D 70/24* (2018.01); *Y02D 70/25* (2018.01); *Y02D 70/26* (2018.01)

(58) Field of Classification Search
None
See application file for complete search history.

(56) References Cited

U.S. PATENT DOCUMENTS

| 2005/0044206 | A1* | 2/2005 | Johansson | H04L 47/10 709/224 |
| 2012/0120828 | A1* | 5/2012 | Anderson | H04W 52/0225 370/252 |
| 2015/0163143 | A1* | 6/2015 | Larsen | G06F 1/3209 370/229 |

* cited by examiner

*Primary Examiner* — Christine T Duong
(74) *Attorney, Agent, or Firm* — Dickinson Wright RLLP

(57) ABSTRACT

Apparatus and methods for estimating data traffic characteristics for applications to condition data communication channels that support data packet transfer for the applications in wireless communication devices are disclosed. Data connections to support different applications and/or daemon software processes can be established and subsequently adjusted based on data traffic characteristics for data that the different applications/daemons generate and/or consume. Traffic flows for the applications/daemons are classified into traffic classes based on likely data traffic patterns. When data sources are added or deleted, changes to a traffic class state can be determined, and wireless circuitry adjusted based at least in part on the traffic class state and a traffic class policy. Adjusting parameters that affect the periodicity and/or length of active time periods and sleep periods in accordance with estimated data traffic patterns for applications/daemons that use the data connections can reduce power consumption by the wireless circuitry.

18 Claims, 9 Drawing Sheets

METHODS AND APPARATUS TO ESTIMATE APPLICATION DATA TRAFFIC CHARACTERISTICS TO CONDITION DATA COMMUNICATION CHANNELS

CROSS-REFERENCE TO RELATED APPLICATIONS

This application claims the benefit of U.S. Provisional Application No. 62/277,414, entitled "METHODS AND APPARATUS TO ESTIMATE APPLICATION DATA TRAFFIC CHARACTERISTICS TO CONDITION DATA COMMUNICATION CHANNELS" filed Jan. 11, 2016, the content of which is incorporated by reference herein in its entirety for all purposes.

FIELD

The described embodiments set forth techniques for estimating data traffic characteristics for applications to condition data communication channels in wireless communication devices.

BACKGROUND

Wireless communication devices include communication capabilities to access a multitude of services through different connections including voice, video, and data connections over a variety of wireless networks, including in some cases cellular wireless networks, wireless local area networks, and wireless personal area networks. Applications on a wireless communication device can establish and delete data flows for communication with remote services through various connections via one or more different wireless networks. Wireless circuitry, such as baseband processors and associated transmit and receive signal chains, can consume different amounts of power based on different settings to support communication for the various data flows for the applications. When transmission or reception of a set of data packets for one or more data flows associated with one or more applications completes, the wireless circuitry can remain in a powered state for a period of time in anticipation of additional data communication for the data flows before transitioning to a lower power state after a period of data inactivity. With limited knowledge of the particular underlying applications and/or associated software processes that generate and consume data for the data flows and their associated data traffic pattern characteristics, the wireless circuitry can be hindered in estimating future data communication requirements and can remain powered longer than necessary. Alternatively, should the wireless circuitry respond rapidly by removing connections as soon as data packet transmission or reception completes, the wireless communication device may re-establish connections soon thereafter when further data packets are available to transfer, thereby adding to signaling overhead for the wireless networks.

SUMMARY

Improvements to power efficiency and network utilization can be accomplished by adjusting communication circuitry of wireless devices based on knowledge of application activity and associated data traffic pattern characteristics for applications executing in the wireless devices. Apparatus and methods to adjust communication components, e.g., wireless circuitry, of a wireless communication device based on an estimation of data traffic patterns for a set of active applications and/or daemon software processes are disclosed herein. The wireless communication device detects addition and deletion of data sources, such as when a socket is opened or closed for an application or daemon. Information about the data sources, such as a name/identification/identifier for the application/daemon and/or properties for services accessed by the application/daemon can be used to estimate the expected data traffic patterns for traffic flows associated with the data sources. The wireless communication device can determine an applicable traffic class for a data source addition and/or deletion and update a traffic class state based on changes to the number of active data sources for each traffic class of the traffic class state. In some embodiments, the traffic class state includes an indication of a zero or non-zero number of active data sources for each traffic class of a plurality of traffic classes, e.g., using values for a single bit for each traffic class in a multi-bit traffic class state. When the number of active data sources for an applicable traffic class changes between a zero value (no active data sources) and a non-zero value (at least one active data source), the wireless communication device can update the traffic class state and adjust communication components of the wireless communication device based at least in part on the updated traffic class state. In some embodiments, the wireless communication device waits for at least a delay period to determine whether the change in the number of active data sources persists before updating the traffic class state and adjusting the communication components. In some embodiments, the wireless communication device also uses a traffic class policy to determine the applicable traffic class for a data source addition/deletion and/or for determining adjustments to the communication components. In some embodiments, the wireless communication device detects the addition and/or deletion of a data source based on the opening and/or closing of a socket used to establish a traffic flow for an associated application/daemon. In some embodiments, the wireless communication device adjusts communication parameters to improve performance and/or to reduce power consumption and/or to change properties for active (awake) states and sleep states based at least in part on the traffic class state. In some embodiments, the wireless communication device adjusts parameters for a connected discontinuous transmission/reception mode for communication via wireless circuitry with a wireless network based at least in part on the traffic class state.

Other embodiments set forth hardware components that are configured to carry out the various techniques set forth herein. Further embodiments set forth a non-transitory computer readable storage medium configured to store instructions that, when executed by a processor, cause the processor to carry out the various techniques set forth herein.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed inventive apparatuses and methods. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
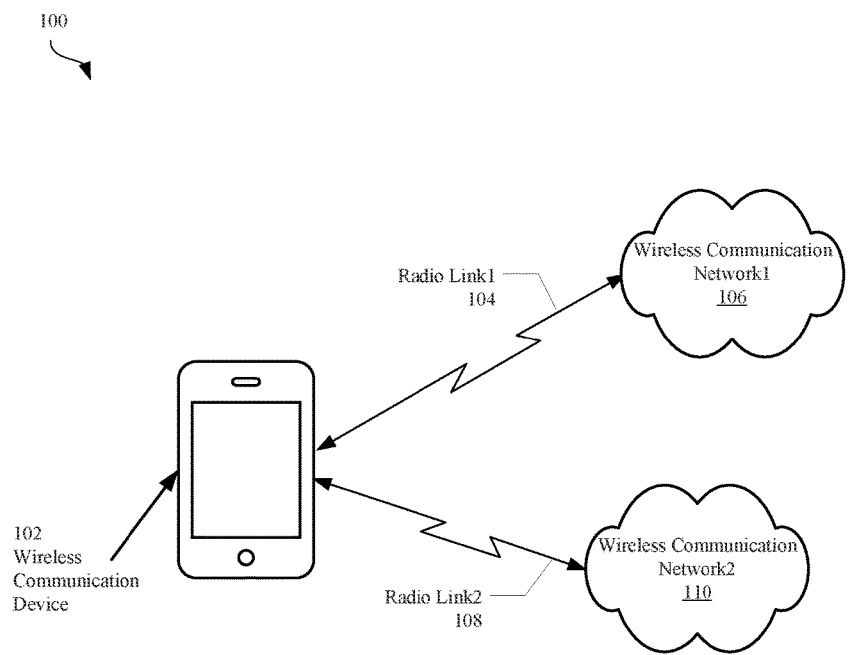
FIG. 1 illustrates a diagram of an example wireless communication device capable of operating in one or more different wireless communication networks, in accordance with some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The described embodiments relate to wireless communications, including techniques for estimating data traffic characteristics for applications to condition data communication channels that support data packet transfer for the applications in wireless communication devices. A wireless communication device can include multiple applications that require varying data connection capabilities as well as generate and consume data with different data traffic pattern characteristics. (In addition to applications, embodiments described herein can apply to software processes that use data communication resources, such as daemons.) Wireless communication devices provide for access to a broad array of services through one or more wireless networks using one or more different applications on the wireless communication device. Some applications use real-time connections, such as a Voice over Internet Protocol (VoIP) call or a video call using Facetime®, while other applications use non-real-time connections, such as for web browsing, email, or messaging. The user of the mobile wireless device can also register with cloud-based services, such as iCloud®, to access additional services, such as used for back-up storage, file sharing, and media/mail/notification synchronization. Data connections to support the different applications can be established and subsequently adjusted based on data traffic characteristics for data that the different applications generate and/or consume. Wireless circuitry can be adjusted based on changes to the traffic class state to improve performance and/or to reduce power consumption by the wireless communication device. In some embodiments, data connections can include support for discontinuous transmission/reception modes that allow for wireless circuitry to be active/awake for a period of time and sleep for a period of time to conserve power. The discontinuous transmission/reception modes can include discontinuous transmission (DTX), discontinuous reception (DRX), and various combinations thereof. In some embodiments, connections can be established that allow for sleep periods while maintaining an underlying signaling connection, e.g., using a connected discontinuous transmission/reception mode, thus allowing for rapid transitions between an active/awake mode, when data transmission and/or reception occurs, and a sleep mode, where at least part of the wireless circuitry is placed in a lower power state to reduce power consumption and extend battery life of the wireless communication device. Adjusting parameters that affect the periodicity and/or the length of active/awake time periods and sleep time periods in accordance with estimated data traffic patterns for applications that use the data connections can provide for reduced power consumption, for example by more quickly transitioning to a sleep period and/or by matching active/awake time periods more closely to data traffic pattern characteristics for data communication of the applications that use the data connections. In addition, the wireless networks that support the data connections can reassign radio resources more efficiently to other wireless communication devices when the applications of the wireless communication device do not need to transmit or receive data for a period of time. Adjustments of wireless circuitry for discontinuous transmission/reception is provided as a non-limiting example, and other adjustments of parameters of wireless circuitry, or more generally communication components that provide for communication via wireless and/or wired connections for an electronic device, can also be used in conjunction with the monitoring of a traffic class state for the electronic device (of which a wireless communication device is a representative example).

Wireless circuitry can have limited knowledge of applications or daemons that transfer data packets for communication via various data connections established and maintained by the wireless circuitry. As described herein, mechanisms to estimate data traffic characteristics for applications and daemons and to provide information about the data traffic characteristics to the wireless circuitry can improve power consumption efficiency of the wireless communication device, as the wireless circuitry can more closely align data connection parameters to the underlying data traffic characteristics for the applications and daemons that use the data connections. Representative data traffic characteristics can include Quality of Service (QoS) parameters such as latency, data rate, target bit and/or packet error rate, priority, etc., as well as data traffic pattern characteristics such as packet size, transmission duration, periodicity, intervals between transmissions, interactivity, data service type, etc. Such data traffic characteristics can be communicated to the wireless circuitry directly, in some embodiments, and/or indirectly, in some embodiments, such as via the use of data traffic classifications. In some embodiments, an applications processor of the wireless communication device monitors applications and/or daemons for opening and closing of sockets used for inter-process communication and provides information to communications processors and/or to wireless circuitry about the state of traffic classes to provide for estimating future network usage for the applications and/or daemons.

In some embodiments, a set of traffic classification types is used by the processors of the wireless communication device to identify different likely data traffic patterns for a set of applications and/or daemons. Some applications and/or daemons can provide traffic class information when establishing sockets for data communication, while applicable traffic classes for other applications and/or daemons can be inferred from information associated with the application and/or daemon, such as an application name, a daemon identifier, a domain address, a target remote service, a service type, or an IP address. In some embodiments, the applications processor uses traffic class information and/or contextual information to estimate likely network usage duration for a data flow that uses a socket for data communication. In some embodiments, the applications processor maintains an association, e.g., a stored table, between applications and/or daemon processes and likely network usage, e.g., data traffic pattern characteristics such as duration, periodicity, interactivity, etc., which can be used to estimate future data traffic and therefore likely network usage. In some embodiments, the applications processor obtains and/or updates the association information from a network-based server. In some embodiments, the network-based server (or associated servers) can collate information from multiple wireless communication devices to derive likely network traffic patterns for various applications and/or daemons, and this crowd-based information can be used to determine an association table and/or to update such an association table. In some embodiments, the wireless communication device adapts parameters of the association table based on historical usage patterns specific to the wireless communication device. In some embodiments, data traffic pattern characteristics for a wireless communication device are based at least in part on an application type, a daemon type, and/or a device type. Different applications/daemons can transfer data according to different data traffic pattern characteristics not only based on their own needs but also tailored to use on a particular wireless communication device type. The same application type, e.g., a messaging application or a web browsing application, can transfer data according to different data traffic characteristics when used on a wireless portable laptop computer, a tablet computer, a cellular phone, or a wearable computing device. In addition, data traffic patterns for applications and/or daemons on a particular wireless communication device can vary based on different users of the particular wireless communication device, and data traffic pattern characteristics can be adapted based on a specific user of a wireless communication device. In some embodiments, data traffic pattern characteristics can be adjusted based on information collected from multiple wireless communication devices, e.g., based on a crowd-sourcing technique. In some embodiments, data traffic patterns can be adapted based on a group of users, e.g., a group of users that work remotely. The techniques described herein for mapping applications/daemons to data traffic characteristics and to communication component settings (such as adjusting wireless circuitry) can be customized based on any combination of historical usage, crowd-sourced information, device type profiling, user groupings, individual user profiling, and/or user preference settings. In some embodiments, processing circuitry of the wireless communication device, such as the applications processor and/or communication processor and/or wireless circuitry, can monitor application data traffic activity and/or daemon data traffic activity and dynamically model the data traffic characteristics for the application and/or daemon to predict future network usage.

In some embodiments, processing circuitry of the wireless communication device combines knowledge of active applications and/or daemons to generate a traffic class state for the wireless communication device. The traffic class state can provide information about a current set of active applications and/or daemons that indicate current network usage and from which future needs for data connections can be estimated, e.g., one or more data traffic characteristics that are likely to occur in the future based on the current traffic class state. In some embodiments, processing circuitry of the wireless communication device monitors opening and closing of sockets and/or changes in states of sockets, such as when entering a TCP closing state in advance of an actual closing of a socket, to predict changes in data traffic. In some embodiments, applications and/or daemons are classified into a set of traffic classes, and applications processing circuitry communicates to communication processing circuitry when a particular traffic class changes between a zero state, in which no applications or daemons that map to the particular traffic class are active, to a non-zero state, when at least one application or daemon that maps to the particular traffic class is active. In some embodiments, the processing circuitry optionally waits a dampening delay time period after detecting a change in traffic class state before reporting an updated traffic class state, where the dampening delay time period can be set to a value to filter out transient changes in traffic class state, such as when a socket is briefly opened and subsequently closed after a brief time interval less than the dampening delay time period.

In some embodiments, applications processing circuitry reports a traffic class state to communications processing circuitry, where the reporting can occur at regular time intervals, based on polling, based on a change of traffic class state, or a combination of these. The applications processing circuitry can, in some embodiments, report a traffic class state only when at least one traffic class changes between a zero state and a non-zero state. In some embodiments, only foreground applications and/or daemons (and/or their equivalents, such as a streaming background application and/or daemon) are counted as contributing to the non-zero state. In some embodiments, in response to a socket event, such as an opening, closing, and/or change of state of a socket, the applications processing circuitry determines an applicable traffic class in which to classify a traffic flow associated with the socket change. Multiple applications and/or daemons can be classified into a particular traffic class based on common (and/or similar) expected traffic pattern characteristics. Representative traffic classifications (or traffic class types) can include unidirectional media streaming, bidirectional media streaming, interactive media communication (which can be subdivided into different types such as audio, video, messaging, etc.), data transfer (which can be subdivided into different duration types and/or direction of transfer, and/or a default type). Additional representative traffic classifications can include specific applications and/or daemons with known (or high likelihood) data traffic pattern characteristics, e.g., a cloud-based query service such as Siri®, an operations, administration, and maintenance (OAM) process, an email service, a messaging service such as iMessage®, or any other number of particular applications or daemons with predicable data traffic pattern characteristics. In some embodiments, a traffic class state message includes a set of bits, e.g., one bit each, for different traffic classes to indicate a zero state or a non-zero state for an associated traffic class. In some embodiments, the traffic class state message includes a second set of bits to indicate changes for traffic classes from a previous (most recently reported) traffic class state, e.g., a bit can be set to indicate a change between a zero state and a non-zero state for a traffic class. In some embodiments, the traffic class state message is provided to communications processing circuitry to use for adjusting data connection parameters based at least in part on estimated data traffic pattern characteristics associated with the current traffic class state indicated in the traffic class state message. In some embodiments, the communications processing circuitry and/or the applications processing circuitry determines actions based on an applicable traffic class policy. In some embodiments, the communications processing circuitry uses a traffic class policy when mapping traffic class states to adjustments of data connection parameters. In some embodiments, the applications processing circuitry uses a traffic class policy to assist with classification of an application and/or daemon. For example, when a new socket is opened, the applications processing circuitry can apply policies associated with the application and/or daemon. In some embodiments, information is provided from one or more software processes when opening, changing a state of, and/or closing a socket to the applications processor, which can use the information in the classification into a traffic class. In some embodiments, the communication processing circuitry uses prioritization of different traffic classes for the traffic class state, e.g., based on a traffic class policy, to determine an applicable adjustment to data connection parameters to support the current traffic class state. In some embodiments, a broad set of applications and/or software process daemons are mapped to a set of traffic classes, each traffic class having an associated set of data traffic pattern characteristics, and a state of active traffic classes is mapped to a set of data connection parameters applicable to the state of active traffic classes. In some embodiments, the set of data connection parameters applicable to higher priority traffic classes (and/or to a highest priority traffic class) among active traffic classes is used to determine the set of data connection parameters with which to adjust wireless circuitry to support data traffic for a current traffic class state of the wireless communication device. In some embodiments, a set of connected mode discontinuous transmission/reception (C-DRX) parameters are adjusted, such as lengths, number of, and/or intervals between different active/awake time periods and sleep time periods, to provide for reduced power consumption in accordance with the current traffic class state of the wireless communication device.

FIG. 1 illustrates a diagram 100 of an example wireless communication device capable of operating in one or more different wireless communication networks, in accordance with some embodiments. The wireless communication device 102 can include a combination of hardware and software to provide wireless connections over one or more different wireless networks alone, separately, or in combination. The wireless communication device 102 can include hardware and software to provide communication with a first wireless communication network 106 (labeled Wireless Communication Network1) via a first radio link 104 (labeled Radio Link1) and with a second wireless communication network 110 (labeled Wireless Communication Network2) via a second radio link 108. Additional radio links (not shown) can be used to also connect with additional wireless communication networks (also not shown). Wireless communication networks can include a wireless personal area network (WPAN) that can provide power efficient connections while operating over a limited range. WPAN connections can typically provide for connecting the wireless communication device 102 to peripheral wireless communication devices, e.g., headsets, earpieces, supplemental display devices, and supplemental input/output devices. A representative WPAN can operate in accordance with a communication protocol standardized by the Bluetooth® Special Interest Group (in Kirkland, Wash.). The wireless communication device 102 can also include hardware and software to provide communication over a wireless local area network (WLAN) that can provide a higher data rate and a greater operating range than a WPAN. The wireless communication device 102 can also operate in accordance with a communication protocol developed by Apple Inc. (in Cupertino, Calif.) and referred to as an Apple Wireless Direct Link (AWDL). Techniques described herein may also be used during wireless communication in accordance with a communication protocol, such as an Institute of Electrical and Electronics Engineers (IEEE) 802.11 standard (which is referred to as Wi-Fi). Furthermore, in some embodiments, the WLAN technology can include a Wi-Fi (or more generically a WLAN) wireless communication subsystem or radio, and the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies. The wireless communication device 102 can include separate hardware and software for the WPAN and the WLAN. In some embodiments, the WPAN and the WLAN can share hardware and or software elements in the wireless communication device 102. Both the WPAN and WLAN can operate as local networks. The wireless communication device 102 can include additional hardware and software to provide a wireless wide area network (WWAN) capability, e.g., to interconnect with one or more cellular wireless networks, e.g., via access network equipment (not shown). Moreover, the wireless communication device 102 can communicate via: a wireless metro area network (WMAN), near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol). Techniques described herein may also be used with a wide variety of other communication protocols, and in electronic devices (such as electronic devices and, in particular, mobile devices) that can incorporate multiple different radio access technologies (RATs) to provide connections through different wireless networks that offer different services and/or capabilities.

The wireless communication device 102, can also be referred to as mobile device, a mobile wireless device, or other equivalent terms and can represent a computing device (e.g., an iPhone® or an iPad® by Apple®) capable of wireless communication. The techniques described herein can apply equally to non-mobile computing devices, such as desktop computers, as well as to mobile computing devices, such as laptop computers, table computing devices, and wearable computing devices. In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

Wireless circuitry in the wireless communication device 102 can include one or more wireless circuitry modules that include one or more processors and wireless circuits to transmit and receive wireless signals according to various wireless communication protocols. A wireless circuitry module (which can also referred to as a wireless subsystem and/or a radio) of the communication device 102 can include transmitters and receivers to provide signal processing of radio frequency wireless signals formatted according to wireless communication protocols, e.g., according to a Wi-Fi wireless communication protocol, a Bluetooth wireless communication protocol, or a cellular wireless communication protocol. In some embodiments, the wireless circuitry module can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components.

Figure 2:
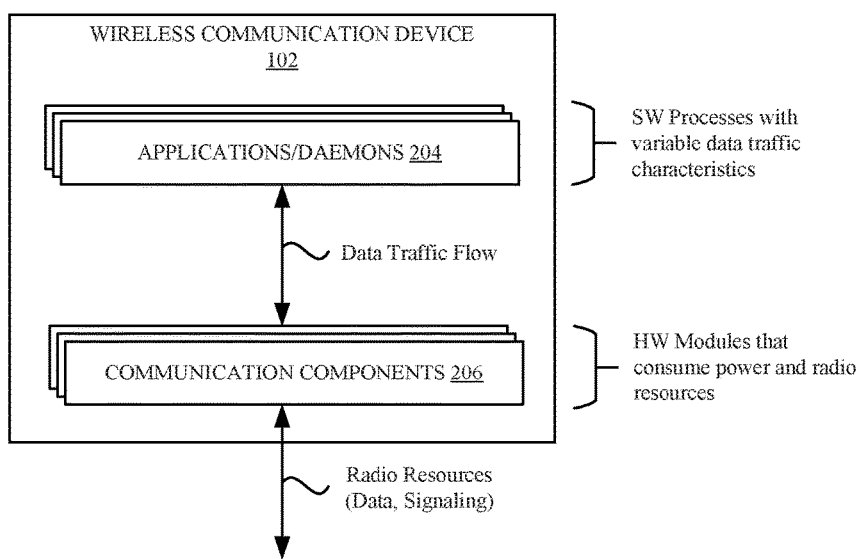
FIG. 2 illustrates a block diagram of representative software processes and hardware modules for data communication by a wireless communication device, in accordance with some embodiments.

FIG. 2 illustrates a block diagram 200 of representative software processes and hardware modules for data communication by a wireless communication device 102, in accordance with some embodiments. The wireless communication device 102 can include applications processing circuitry, which can process various applications/daemons 204, at least some of which can generate and/or consume data traffic for communication with other computing devices external to the wireless communication device. Each application/daemon 204 can be a software process with its own data traffic characteristic. Rather than customize data communication for each individual application/daemon 204, the wireless communication device 102 can aggregate data traffic flows for a set of applications/daemons 204 into a set of one or more data connections established to support the data traffic flows of the applications/daemons 204. The wireless communication device 102 can include a set of communication components 206 that provide for signaling with one or more communication networks to establish, maintain, modify, and tear down data connections. In some embodiments, the communication networks include one or more wireless networks that each can use shared radio frequency resources for signaling and/or for data communication. When active, various hardware modules of the communication components 206 can consume power drawn from stored battery levels of the wireless communication device 102. Maintaining hardware modules in a continuous active state would drain power more rapidly, thereby affecting battery life, than when operated in discontinuous modes that transition between an active state for communication and a lower power state for power conservation. Applications processing circuitry can monitor for the initiation and/or closing of sockets for data traffic flows to support communication for applications/daemons 204 of the wireless communication device 102. The applications processing circuitry can classify an associated data traffic flow according to a set of traffic classes and maintain a current state of active/inactive traffic classes for a set of applications/daemons 204 of the wireless communication device 102. The applications processing circuitry can generate and communicate a message that includes a summary of active/inactive traffic classes, e.g., a current traffic class state of the wireless communication device 102, to communication processing circuitry, which can include communication components 206. The communication processing circuitry can adjust data connection parameters for wireless circuitry of the communication components 206 in accordance with the communicated traffic class state. In some embodiments, the communication processing circuitry also uses a traffic class policy to determine applicable actions to take, e.g., when determining priorities of various active traffic classes and/or to map a set of active traffic classes to applicable wireless circuitry configuration settings. In some embodiments, applications/daemons 204 optionally mark data packets, and/or provide other direct indications when initiating a socket, that can indicate required (and/or requested) communication characteristics for a data traffic flow associated with the socket, e.g., lower latency for real-time applications or best effort for non-critical applications. In some embodiments, the applications processing circuitry accounts for required (and/or requested) communication characteristics when mapping a data traffic flow for an application/daemon 204 to a traffic class. In some embodiments, Quality of Service (QoS) tags for data packets (and/or for data traffic flows) can indicate various preferred data traffic characteristics and/or prioritization. In some embodiments, the applications processing circuitry maps a data traffic flow based also on additional estimated data traffic pattern characteristics, such as duration of usage and/or a level of interactivity and/or a primary direction of transfer (e.g., in a downlink direction for downloading from a network entity, or in an uplink direction for uploading to a network entity) for the data traffic flow associated with an application/daemon 204. In some embodiments, the communications processing circuitry uses a priori knowledge of predicted data traffic patterns for different data traffic classes to determine adjustments for settings of wireless circuitry of the wireless communication device 102. In some embodiments, adjustments can include changing parameters for a discontinuous transmission/reception mode.

Table 1 summarizes a representative table of traffic classes including a traffic class label, an associated bit position for a representative traffic class state field (which can be included in a message), a brief description of the traffic class, and a label for a sample daemon associated with such a traffic class.

TABLE 1

Traffic Classification

| Label | Bit Position | Description | Sample Daemon |
|---|---|---|---|
| BK_SYS | 1 | Background, system initiated | |
| BK | 2 | Background, user initiated | |
| RD | 3 | Responsive Data | |
| OAM | 4 | Operations, Administration, and Maintenance | |
| AV | 5 | Multimedia Audio/Video Streaming | |
| RV | 6 | Responsive Multimedia Streaming | |
| VI | 7 | Interactive Video | |
| VO | 8 | Interactive Audio | |
| CTL | 9 | Network Control | |
| LargeDL | 10 | Large Transfers, Mainly Download | com.apple.AppStore |
| Large UL | 11 | Large Transfers, Mainly Upload | cloudphotod |
| Large | 12 | Large Transfers | cloudd |
| SingleBurst | 13 | Single Two-Way Transaction | com.apple.mobilecal |
| Siri | 14 | Siri | assistant |
| Push | 15 | Push Service, Typically Small Downloads | apsd |
| BestEffortDaemon | 16 | Known Daemon, No Specialized Usage | ubd |
| BestEffort | 17 | Default, Unclassified | |
| IMSG | 18 | iMessage | com.apple.MobileSMS |

Different traffic classes can be expected to have different data traffic patterns. Some traffic classes can have regular data flows, such as for streaming applications, while others can have irregular data flows, such as when interactive. Some traffic classes can include primarily unidirectional data flows, such as for large download or large update transfers. Some traffic classes can include a short duration transfer, which can be unidirectional or bidirectional, such as with a short response expected. By classifying data flows for sockets that are opened and/or closed to support an application/daemon 204, the applications processing circuitry can provide information to the communication processing circuitry useful for adjusting parameters to configure wireless circuitry of the wireless communication device.

Figure 3:
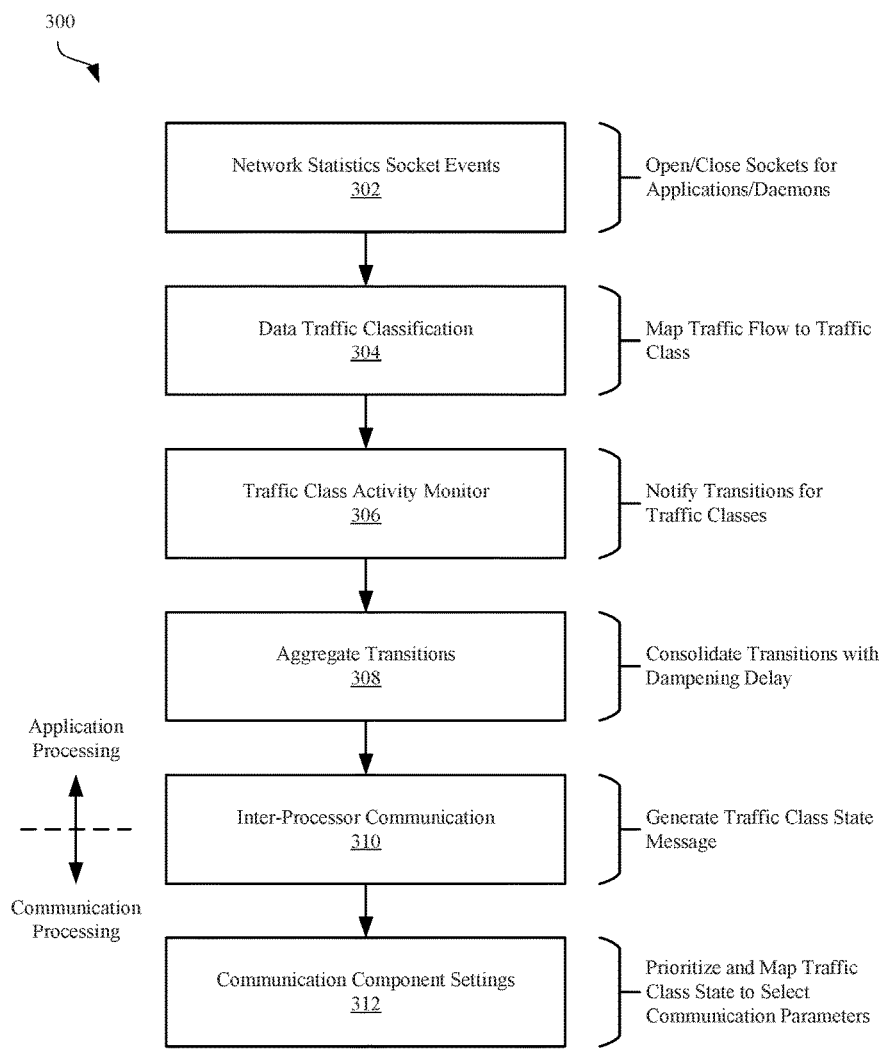
FIG. 3 illustrates a flow diagram of an example message flow between application processing elements and communication processing elements of a wireless communication device, in accordance with some embodiments.

FIG. 3 illustrates a flow diagram 300 of an example message flow between application processing elements and communication processing elements of a wireless communication device 102, in accordance with some embodiments. In 302, the applications processing circuitry of the wireless communication device 102 monitors for network statistics socket events, such as when a socket is opened and/or closed and/or modified for establishing, dropping, and/or changing a data traffic flow for an associated application/daemon 204. In 304, the applications processing circuitry can map the data traffic flow into a traffic class, e.g., in accordance with a set of traffic classes as shown in Table 1, or an equivalent. The applications processing circuitry can associate different applications/daemons 204 with different traffic classes, each traffic class having identifiable data traffic pattern characteristics. For example, when a socket is opened for a particular application/daemon 204, such as for downloading an application or accessing a cloud-based storage service, the applications processing circuitry can associate a data traffic flow with an applicable traffic class that has predictable data traffic characteristics for access to such a service, e.g., a high likelihood of a large download data transfer. Similar mappings can be made for other applications/daemons 204 to map data traffic flows to traffic classes with appropriate data traffic characteristics. In 306, the applications processing circuitry can monitor the set of traffic classes to determine whether a traffic class is in an inactive state, e.g., when no applications/daemons 204 are active that correspond to that traffic class, or in an active state, e.g., when at least one application/daemon 204 is active that corresponds to that traffic class. In some embodiments, the applications processing circuitry accounts for changes of a traffic class state between the inactive state and the active state for a set of traffic classes, e.g., for one or more traffic classes summarized in Table 1. In 308, the applications processing circuitry consolidates any traffic class changes into a current traffic class state. In some embodiments, the applications processing circuitry includes a dampening delay to filter out short duration transitions that occur in less than the dampening delay time interval. In a representative embodiment, the dampening delay time period can be set between to a value to filter out short transient changes in the traffic class state, e.g., when a socket may be briefly opened and then closed or when a socket is closed and a comparable socket is opened within a short time period. In some embodiments, the dampening delay time period can be set in a range of values that span a non-zero interval between one millisecond and five-hundred milliseconds. In some embodiments, the dampening delay time period can be set to zero. In some embodiments, the dampening delay period can be set on the order of tens of milliseconds or hundreds of milliseconds. In some embodiments, the dampening delay period can be optional and therefore the use of the dampening delay period omitted in some implementations. In 310, the applications processor generates a message that includes a current traffic class state for a set of traffic classes and communicates the message to communication processing circuitry of the wireless communication device 102. In some embodiments, the message includes one or more of: a version number, a currently active traffic class state field, a changed traffic state field, or a background/foreground field. In some embodiments, each bit of the currently active traffic class state field can correspond to a different traffic class, the value of the bit indicating whether the corresponding traffic class is inactive (no active applications/daemons 204 mapping to that traffic class) or active (at least one active application/daemon 204 mapping to that traffic class). In some embodiments, each bit of the changed traffic state field can correspond to whether the corresponding traffic class changed between an inactive state and an active state since a most recently communicated message that includes the traffic class state was provided to the communications processing circuitry by the applications processing circuitry. For example, a bit value of zero can indicate no change of traffic class state, while a bit value of one can indicate a change of traffic class state for the corresponding traffic class. In some embodiments, the version field can provide context for the communications processing circuitry to interpret the message. In some embodiments, the background/foreground field can include bits for each traffic class to indicate whether the traffic class includes an active background and/or foreground application/daemon 204. In 312, the communication processing circuitry can adjust settings of one or more communication components 206, which can include processors and/or wireless circuitry components, such as transmit and/or receive signal chains, based on the communicated traffic class state provided by the message (and/or based on a history of such messages). In some embodiments, the communication processing circuitry selects communication parameters to adjust settings of the one or more communication components 206 based on the traffic class state and a traffic class policy, which can include prioritizations between various traffic class states and/or information on how to map active traffic classes to various settings for wireless communication, i.e., for adjusting the communication components 206. In some embodiments, the communication processing circuitry maps changes between the current traffic class state and previous traffic class state to add, delete, or change properties of communication links, such as radio access bearers (RABs) to support the expected data traffic characteristics for the set of active traffic classes as indicated in the message. In some embodiments, the wireless communication circuitry resolves conflicting requirements among multiple active traffic classes, e.g., based on a prioritization or other rules of a traffic class policy.

Figure 4:
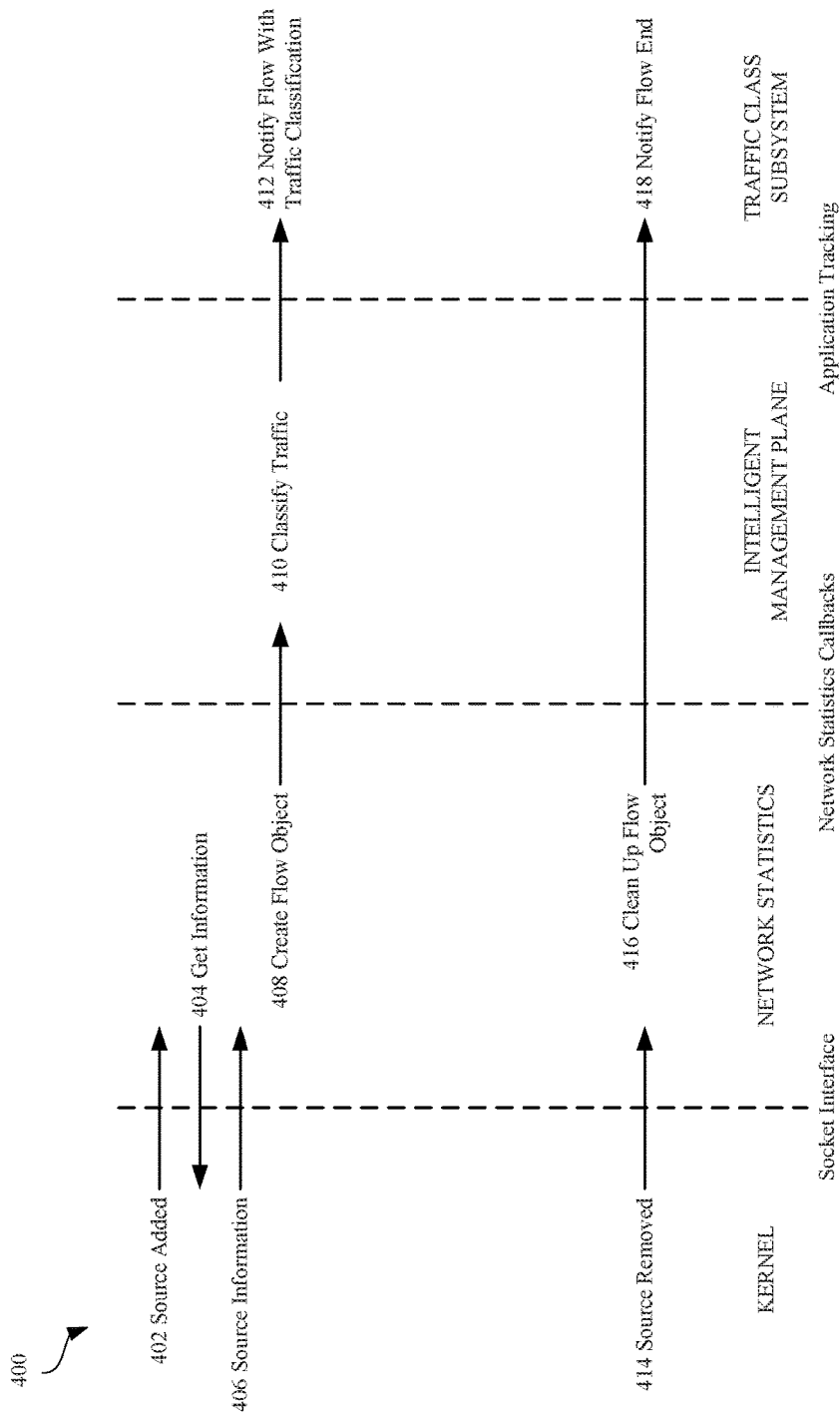
FIG. 4 illustrates a flow diagram of an example message sequence between the application processing elements of a wireless communication device, in accordance with some embodiments.

FIG. 4 illustrates a flow diagram 400 of an example message sequence between application processing elements of the application processing circuitry of a wireless communication device 102, in accordance with some embodiments. At 402, a kernel (or other central operation system element) adds a data traffic source, e.g., opens a socket for an application/daemon 204, and provides an indication of the source addition via a socket interface to a network statistics processing element. At 404, the network statistics processing element queries the kernel for additional information about the socket opening, e.g., by sending a get information message to the kernel via the socket interface. At 406, the kernel responds to the get information message by sending additional information about the added data source to the network statistics processing element via the socket interface, e.g., by sending a source information message. The source information message can include information about the application/daemon 204 that caused the socket opening, which will provide for a data traffic flow for the application/daemon 204. In some embodiments, the source information message includes one or more data traffic characteristics associated with the source addition. At 408, the network statistics processing element creates an indication of a traffic flow (e.g., a traffic flow object) to a intelligent management plane processing element. In some embodiments, the indication includes data traffic characteristics and/or application/daemon 204 information with which the intelligent management plane processing element can classify, at 410, the data traffic flow for the application/daemon 204 that caused the socket to open. At 412, the intelligent management plane processing element provides a notification message to a traffic class processing subsystem of the traffic flow with an accompanying traffic classification. In some embodiments, the intelligent management plane processing element maps the data traffic flow for the application/daemon 204 to a traffic class with which data traffic characteristics most closely match the likely data traffic patterns for the traffic flow for the application/daemon 204. The traffic class subsystem and/or the intelligent management plane subsystem can correlate multiple source additions (and also source changes and deletions) to form a traffic class state as part of message communicated from the applications processing circuitry to communications processing circuitry of the wireless communication device 104 in order for the latter adjust wireless circuitry in accordance with a current traffic class state (and/or in accordance with changes between a current traffic class state and a previous traffic class state). In some embodiments, the intelligent management plane processing element and/or the traffic class subsystem processing element maps the traffic flow for the application/daemon 204 to a traffic class based on a traffic class policy. In some embodiments, the intelligent management plane processing element infers an applicable traffic class for the traffic flow based on a name/identification/identifier of a service used by the application/daemon 204. For example, the intelligent management plane processing element can distinguish an application used for shopping from an application used for video streaming, even when both are offered via a common domain name. In some embodiments, the communication processing circuitry maps the traffic class state of the wireless communication device 104 to a set of communication component (e.g., wireless circuitry) parameters to support data traffic flows for the traffic class state.

Source additions and source deletions can both be monitored. At 414, the kernel processing element detects removal of a source, e.g., in response to closing of an application or from a daemon, provides an indication of the source removal to the network statistics processing element via the socket interface. The network statistics processing element can match the source deletion to a traffic flow and, at 416, can clean up the traffic flow object, an indication of which can be passed via the intelligent management plane processing element to the traffic class subsystem, which can correlate the deletion with a change in the traffic class state of the wireless communication device 102. The traffic class subsystem, at 418, can update the current traffic class state and provide a message to the communications processing circuitry of the updated traffic class state to account for the deletion of the source (and removal of associated data traffic flows). In some embodiments, the communications processing circuitry adjusts communication component settings based at least in part on the updated traffic class state.

Figure 5:
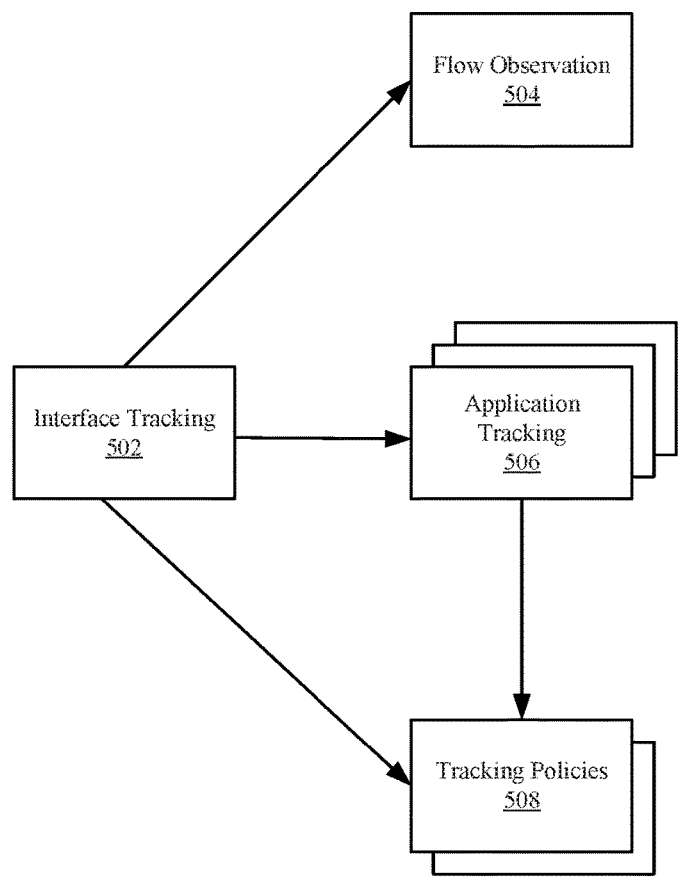
FIG. 5 illustrates a block diagram of message paths between exemplary application processing elements of a wireless communication device, in accordance with some embodiments.

FIG. 5 illustrates a block diagram 500 of message paths between exemplary application processing elements of a wireless communication device, in accordance with some embodiments. In some embodiments, the processing elements illustrated by block diagram 500 can provide for adaptive traffic classification based on a form of a machine-learning process, where applications/daemons 204 and associated traffic flows can be characterized and customized for a particular wireless communication device 104 and/or a particular user thereof. Applications 204 may provide different traffic flows, and therefore be assigned to different traffic classes, on different wireless communication device 104 and/or for different users of wireless communication devices 104 based on properties of the wireless communication device 104 and/or usage patterns of the user of the wireless communication device 104. For example, data traffic patterns for use of a social media application can vary substantially between different users. In some embodiments, an interface tracking processing element 502 can include a default traffic class policy for mapping applications/daemons 204 to traffic classes. An application tracking processing element 506 can include information about traffic flows for one or more users and/or for one or more wireless communication device 104 of the same and/or different device type. In some embodiments, the application tracking processing element 506 includes a specific traffic class policy for mapping applications/daemons 204 to traffic classes, where the specific traffic class policy is customized for the particular wireless communication device 104 and/or for a user (or users) thereof. In some embodiments, the default traffic class policy can be static, or effectively static, and change infrequently, e.g., based on updates provided from a network-based service, while the specific traffic class policy can be dynamic and changed based on actual observations of data traffic flows and data traffic pattern characteristics associated with data traffic flows for various applications/daemons 204. In some embodiments, a flow observation processing element 504 obtains information from the interface tracking processing element 502 to determine a traffic class policy to apply for one or more traffic flows associated with the opening and/or closing of sockets that generate the one or more traffic flows. In some embodiments, the flow observation processing element 504 maintains an array including counts for the number of traffic flows of each traffic class, e.g., from which a traffic class state can be derived.

Figure 6:
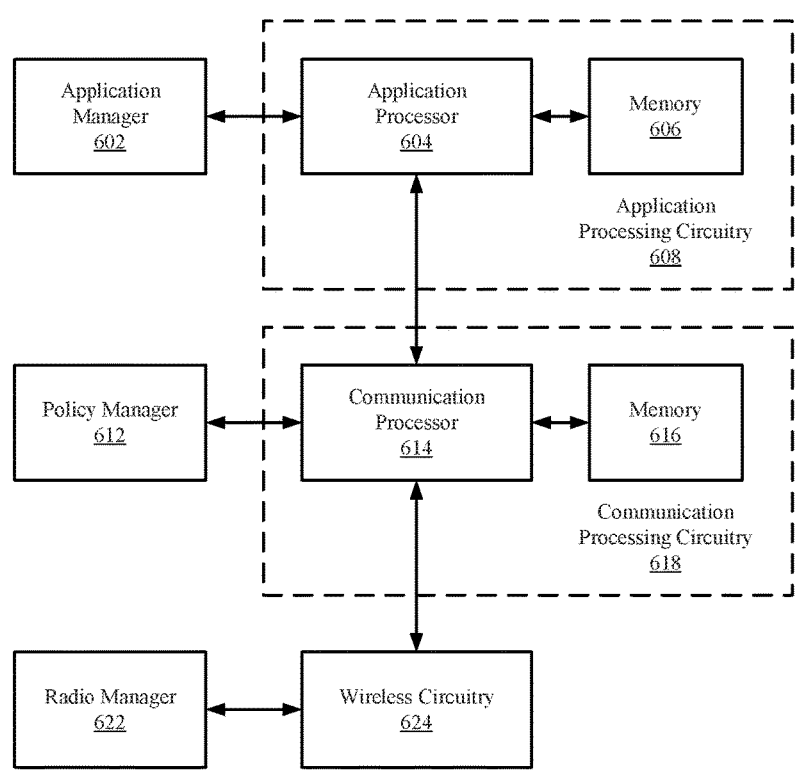
FIG. 6 illustrates a block diagram of exemplary software and hardware processing elements of a wireless communication device, in accordance with some embodiments.

FIG. 6 illustrates a block diagram 600 of exemplary software and hardware processing elements of a wireless communication device 102, in accordance with some embodiments. Application processing circuitry 608, which can include an application processor 604 communicatively coupled with an associated memory 606 can execute instructions that cause the wireless communication device to implement various techniques described herein. For example, the application processing circuitry 608 can realize an application manager 602 that provides for one or more functions performed by application processing circuitry 608 as described for FIG. 3. The application processing circuitry 608 can realize functions for detecting the opening and closing of sockets for various applications/daemons 204, mapping traffic flows associated with the sockets to applicable traffic classes, monitoring traffic class activities to notify when transitions for traffic classes occur, such as between a zero inactive state to a non-zero active state for a traffic class, consolidating transitions for the traffic classes filtered by a dampening delay to form an aggregate traffic class state, and generating a message that includes the current traffic class state and/or changes to a traffic class state to communicate to the communication processing circuitry 618. The communication processing circuitry 618 can include a communication processor 614 (or multiple communication processors) and associated memory 616, where the communication processing circuitry can execute instructions to realize a policy manager 612, which can receive messages from the application processing circuitry 608 and determine applicable parameter settings for communication components, such as for wireless circuitry 624, which can be controlled by a radio manager 622 function. In some embodiments the communication processing circuitry 618 in conjunction with the wireless circuitry 624 can prioritize and map a traffic class state (and/or a history of traffic class states) to select an applicable set of communication parameters with which to set various communication components 206 (of which the wireless circuitry 624 is an exemplary realization thereof). The block diagram 600 provides an example structural split between application processing and communication processing; however, the same techniques described herein can equally apply to other structures, such as with more or fewer processors, memories, and management functions realized based on execution of instructions by the processors. In some embodiments, application processing functions and/or communication processing functions can be combined in a single integrated circuit and/or in a combination of integrated circuits packaged together.

Figure 7A:
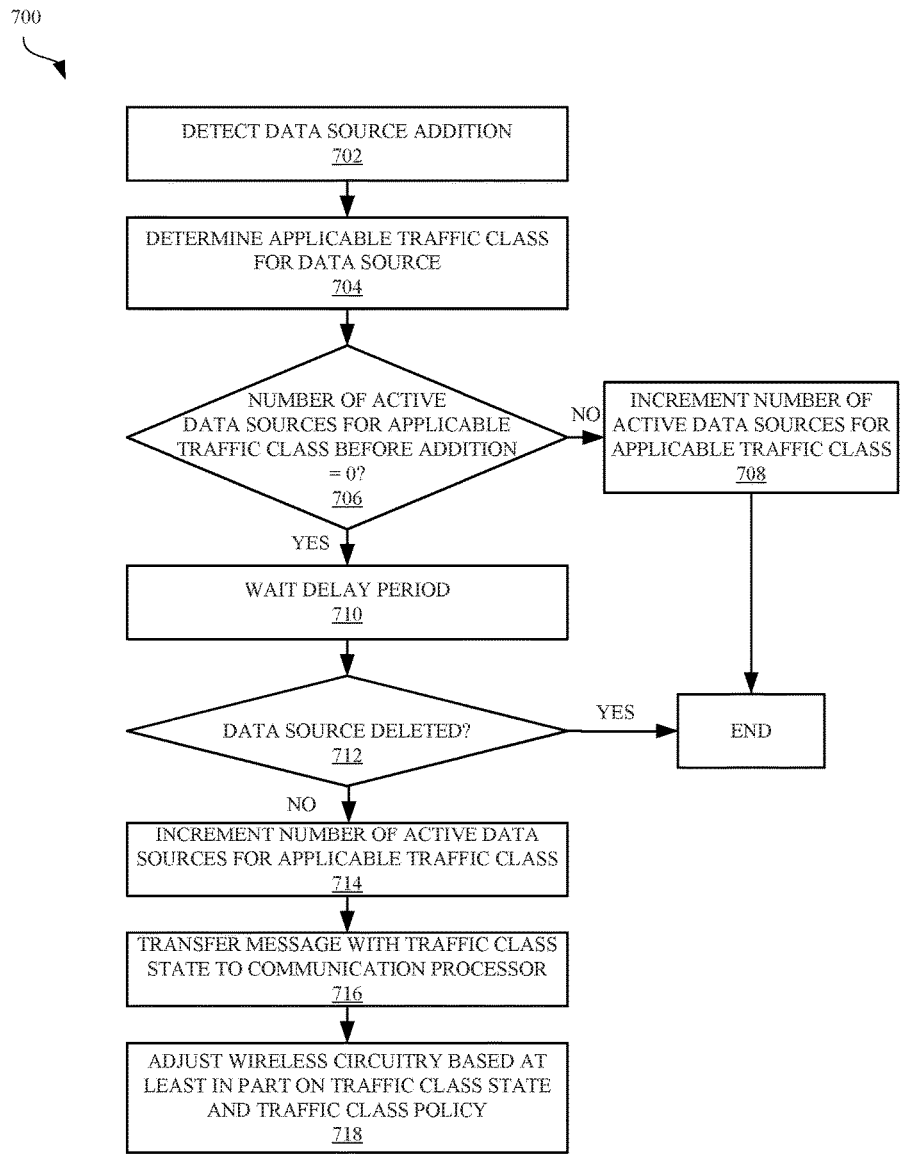
FIGS. 7A and 7B illustrate flow charts of example methods for adjusting wireless circuitry based on application data traffic state changes, in accordance with some embodiments.

FIG. 7A illustrates a flow chart 700 of an example method for adjusting wireless circuitry of a wireless communication device 102 based on changes in a traffic class state, in accordance with some embodiments. At 702, the addition of a data source is detected, e.g., by application processing circuitry 608 identifying the opening of a socket that generates a new traffic flow. The data source communicates data traffic, e.g., by generating and/or consuming the data traffic. At 704, an applicable traffic class for the added data source, such as by mapping information obtained from the socket opening and/or an underlying application/daemon that will use the traffic flow. At 706, it is determined whether the number of active data sources of the same applicable traffic class, before the most recent data source addition, is zero or non-zero. When at least one active data source for the same applicable traffic class exists before the addition, at 708, in some embodiments, the number of active data sources for the applicable traffic class is incremented. In some embodiments, an array stored in the memory 606 of the application processing circuitry 608 is updated, at 708, based on the change in the number of active data sources for the applicable traffic class. When the data source addition causes the number of active data traffic sources for the applicable traffic class to change from zero to non-zero, i.e., before the addition the number of active data sources for the applicable traffic class was zero, then at 710, optionally, a wait delay period (dampening filter) is invoked to filter out short transient changes in the data sources. At 712, after expiration of the optional wait delay period, it is determined whether the added data source persists or was deleted during the optional wait delay period. When the data source persists at least as long as the optional wait delay period, at 714, the number of active data sources for the applicable traffic class is incremented (e.g., from zero to one). At 716, a message that includes an accumulation of traffic class state changes for all applicable traffic classes that changed between a zero inactive state and a non-zero active state is transferred to communication processing circuitry 618. At step 718, wireless circuitry 624 (or more generally communication components 206) is adjusted based at least in part on the traffic class state included in the message and on a traffic class policy. In some embodiments, the communication processing circuitry 618 maps the traffic class state of the message to settings for the wireless circuitry 624 based on prioritization of the different active traffic classes and on communication component settings matched to a highest priority active traffic class (or set of active traffic classes with highest priority). In some embodiments, settings for a connected discontinuous transmission/reception mode are adjusted based at least in part on the traffic class state communicated in the message. In some embodiments, settings for communication components are adjusted to reduce power consumption when possible to match the set of active traffic classes communicated in the message. In some embodiments, settings for communication components are adjusted to account for likely data traffic patterns associated with one or more active traffic classes indicated in the traffic class state of the message.

Figure 7B:
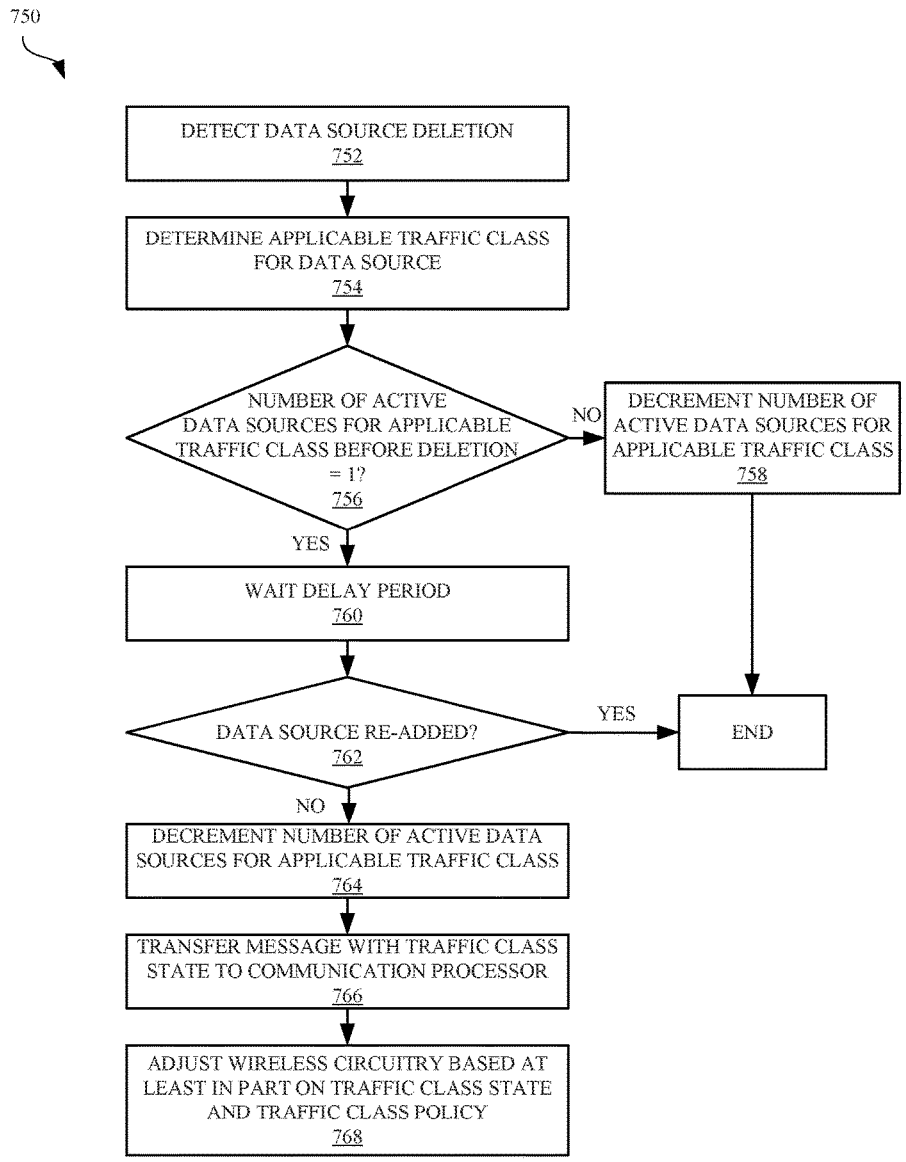

FIG. 7B illustrates a flow chart 750 of another example method for adjusting wireless circuitry of a wireless communication device 102 based on changes in a traffic class state, in accordance with some embodiments. At 752, the deletion of a data source is detected, e.g., by application processing circuitry 608 identifying the closing of a socket associated with a traffic flow. At 754, an applicable traffic class for the deleted data source, such as by mapping information obtained from the socket closing and/or based on knowledge of an underlying application/daemon that used an associated traffic flow. At 756, it is determined whether the number of active data sources of the same applicable traffic class, before the most recent data source deletion, equals one, i.e., whether the number of active data sources with the deletion will be zero. When at least two active data sources for the same applicable traffic class exist before the deletion, at 758, in some embodiments, the number of active data sources for the applicable traffic class is decremented. In some embodiments, an array stored in the memory 606 of the application processing circuitry 608 is updated, at 758, based on the change in the number of active data sources for the applicable traffic class. When the data source deletion causes the number of active data traffic sources for the applicable traffic class to change from one to zero, i.e., before the deletion the number of active data sources for the applicable traffic class was one, then at 760, a wait period (dampening filter) is optionally invoked to filter out short transient changes in the data sources. At 762, after expiration of the optional wait delay period, it is determined whether the deleted data source (or an equivalent data source of the same applicable traffic class) was re-added during the optional wait delay period. When the data source deletion persists at least as long as the optional wait delay period, at 764, the number of active data sources for the applicable traffic class is decremented (e.g., from one to zero). At 766, a message that includes an accumulation of traffic class state changes for all applicable traffic classes that changed between a zero inactive state and a non-zero active state is transferred to communication processing circuitry 618. At step 768, wireless circuitry 624 (or more generally communication components 206) is adjusted based at least in part on the traffic class state included in the message and on a traffic class policy. In some embodiments, the communication processing circuitry 618 maps the traffic class state of the message to settings for the wireless circuitry 624 based on prioritization of the different active traffic classes and on communication component settings matched to a highest priority active traffic class (or set of active traffic classes with highest priority). In some embodiments, settings for a connected discontinuous transmission/reception mode are adjusted based at least in part on the traffic class state communicated in the message. In some embodiments, settings for communication components are adjusted to reduce power consumption when possible to match the set of active traffic classes communicated in the message. In some embodiments, settings for communication components are adjusted to account for likely data traffic patterns associated with one or more active traffic classes indicated in the traffic class state of the message.

Figure 8:
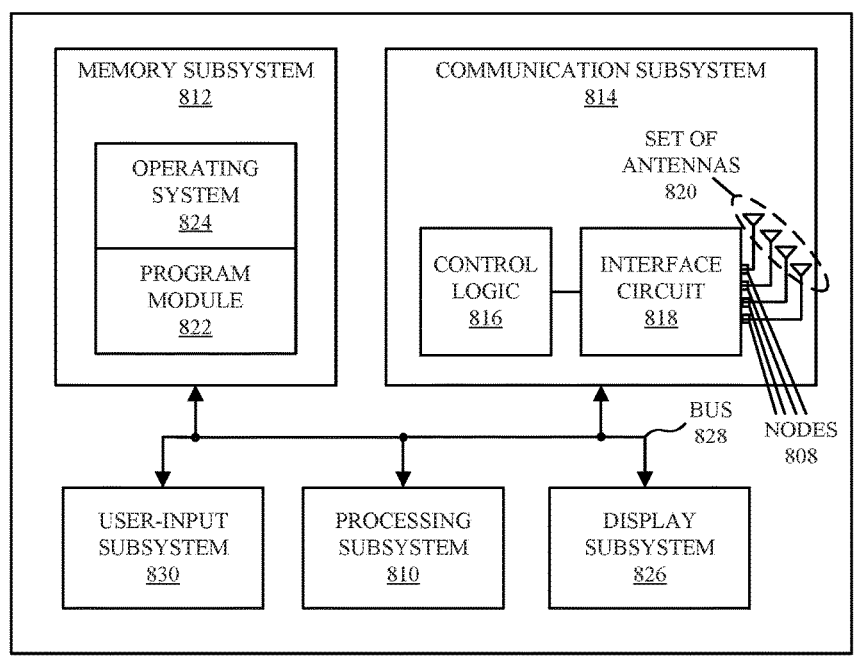
FIG. 8 illustrates a detailed view of an exemplary computing device that can be used to implement at least a portion of the various techniques described herein, in accordance with some embodiments.

FIG. 8 presents a block diagram 800 of an electronic device, which can be a wireless communication device 102, in accordance with some embodiments. This electronic device includes processing subsystem 810, memory subsystem 812, and communication subsystem 814. Processing subsystem 810 includes one or more devices configured to perform computational operations. For example, processing subsystem 810 can include one or more microprocessors, application-specific integrated circuits (ASICs), microcontrollers, programmable-logic devices, and/or one or more digital signal processors (DSPs).

Memory subsystem 812 includes one or more devices for storing data and/or instructions for processing subsystem 810 and networking subsystem 814. For example, memory subsystem 812 can include dynamic random access memory (DRAM), static random access memory (SRAM), a read-only memory (ROM), flash memory, and/or other types of memory. In some embodiments, instructions for processing subsystem 810 in memory subsystem 812 include: one or more program modules or sets of instructions (such as program module 822 or operating system 824), which may be executed by processing subsystem 810. For example, a ROM can store programs, utilities or processes to be executed in a non-volatile manner, and DRAM can provide volatile data storage, and may store instructions related to the operation of the electronic device. Note that the one or more computer programs may constitute a computer-program mechanism or software. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810. In some embodiments, the one or more computer programs are distributed over a network-coupled computer system so that the one or more computer programs are stored and executed in a distributed manner.

In addition, memory subsystem 812 can include mechanisms for controlling access to the memory. In some embodiments, memory subsystem 812 includes a memory hierarchy that includes one or more caches coupled to a memory in the electronic device. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by the electronic device as fast-access storage for often-used data, while the mass-storage device is used to store less frequently used data.

Communication subsystem 814 includes one or more devices configured to couple to and communicate on a wired and/or wireless network (e.g., to perform network operations), including: control logic 816, an interface circuit 818 and a set of antennas 820 (or antenna elements) in an adaptive array that can be selectively turned on and/or off by control logic 816 to create a variety of optional antenna patterns or 'beam patterns.' (While FIG. 8 includes set of antennas 820, in some embodiments the electronic device includes one or more nodes, such as nodes 808, e.g., a pad, which can be coupled to set of antennas 820. Thus, the electronic device may or may not include set of antennas 820.) For example, communication subsystem 814 can include a Bluetooth™ communication system, a cellular communication system (e.g., for communication with a 3G/4G network such as UMTS, LTE, etc.), a universal serial bus (USB) communication system, a communication system based on the standards described in IEEE 802.11 (e.g., a Wi-Fi® communication system), an Ethernet communication system, and/or another communication system.

Communication subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on a network for each communication system are sometimes collectively referred to as a 'network interface' for the communication system. Moreover, in some embodiments a 'network' or a 'connection' between the electronic devices does not yet exist. Therefore, the electronic device may use the mechanisms in communication subsystem 814 for performing simple wireless communication between the electronic devices, e.g., transmitting advertising or beacon frames and/or scanning for advertising frames transmitted by other electronic devices.

Within the electronic device, processing subsystem 810, memory subsystem 812, and networking subsystem 814 are coupled together using bus 828 that facilitates data transfer between these components. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, the electronic device includes a display subsystem 826 for displaying information on a display, which may include a display driver and the display, such as a liquid-crystal display, a multi-touch touchscreen, etc. Display subsystem 826 may be controlled by processing subsystem 810 to display information to a user (e.g., information relating to incoming, outgoing, or an active communication session).

The electronic device can also include a user-input subsystem 830 that allows a user of the electronic device to interact with the electronic device. For example, user-input subsystem 830 can take a variety of forms, such as: a button, keypad, dial, touch screen, audio input interface, visual/image capture input interface, input in the form of sensor data, etc.

The electronic device can be (or can be included in) any electronic device with at least one communication/network interface. For example, the electronic device may include: a cellular telephone or a smartphone, a tablet computer, a laptop computer, a notebook computer, a personal or desktop computer, a netbook computer, a media player device, an electronic book device, a MiFi® device, a smart watch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device, in alternative embodiments, different components and/or subsystems may be present in the electronic device. For example, the electronic device may include one or more additional processing subsystems, memory subsystems, networking subsystems, and/or display subsystems. Additionally, one or more of the subsystems may not be present in the electronic device. Moreover, in some embodiments, the electronic device may include one or more additional subsystems that are not shown in FIG. 8. Also, although separate subsystems are shown in FIG. 8, in some embodiments some or all of a given subsystem or component can be integrated into one or more of the other subsystems or component(s) in the electronic device. For example, in some embodiments program module 822 is included in operating system 824 and/or control logic 816 is included in interface circuit 818.

Moreover, the circuits and components in the electronic device may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of communication subsystem 814. This integrated circuit may include hardware and/or software mechanisms that are used for transmitting wireless signals from the electronic device and receiving signals at the electronic device from other electronic devices. Aside from the mechanisms herein described, radios are generally known in the art and hence are not described in detail. In general, communication subsystem 814 and/or the integrated circuit can include any number of radios. Note that the radios in multiple-radio embodiments function in a similar way to the described single-radio embodiments.

In some embodiments, communication subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein includes receiving signals from other electronic devices and possibly performing one or more processing operations on the received signals, e.g., determining if the received signal includes a trigger, providing a trigger response, etc.).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a wireless communication protocol as an illustrative example, in other embodiments a wide variety of communication protocols and, more generally, wireless and/or wired communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 222, operating system 224 (such as a driver for interface circuit 218) or in firmware in interface circuit 218. Alternatively or additionally, at least some of the operations in the communication technique may be implemented in a physical layer, such as hardware in interface circuit 218. In an exemplary embodiment, the communication technique is implemented, at least in part, in a MAC layer in interface circuit 218.

Representative Embodiments

In some embodiments, a method to adjust wireless circuitry in a wireless communication device includes: (i) detecting addition of a data source that communicates data traffic, e.g., by generating and/or consuming the data traffic; (ii) determining an applicable traffic class for the data source; and (iii) when the number of active data sources for the applicable traffic class before the addition is zero: incrementing the number of active data sources for the applicable traffic class, transferring a message that includes a traffic class state to communications circuitry, and adjusting wireless circuitry based at least in part on the traffic class state and a traffic class policy.

In some embodiments, the method further includes, when a number of active data sources for the applicable traffic class before the addition is non-zero, incrementing the number of active data sources for the applicable traffic class. In some embodiments, the method further includes, when the number of active data sources for the applicable traffic class before the addition is zero: waiting a delay period, determining whether the data source is deleted during the delay period, and only when the data source persists for the delay period, performing the incrementing of the number of active data sources, the transferring of the message, and the adjusting of the wireless circuitry. In some embodiments, the addition of the data source includes detecting an opening of a socket to establish a traffic flow. In some embodiments, the traffic class state includes an indicator bit value for each of a plurality of traffic classes, the indicator bit value indicating whether the number of active data sources for the associated traffic class is zero or non-zero. In some embodiments, the traffic class policy indicates a prioritization of the traffic classes in the plurality of traffic classes. In some embodiments, the adjusting the wireless circuitry includes modifying settings to reduce power consumption of the wireless communication device. In some embodiments, the adjusting the wireless circuitry includes modifying one or more parameters for a connected discontinuous transmission/reception mode for communication via the wireless circuitry with a wireless network. In some embodiments, the adjusting the wireless circuitry is further based at least in part on a device type of the wireless communication device. In some embodiments, the adjusting the wireless circuitry is further based at least in part on a historical usage pattern for a user of the wireless communication device. In some embodiments, the adjusting the wireless circuitry reduces power consumption of the wireless communication device by causing at least a portion of the wireless circuitry to enter a lower power state. In some embodiments, the determining the applicable traffic class includes selecting the applicable traffic class from a plurality of traffic classes based at least in part on information obtained for the data source addition. In some embodiments, the information includes a name of an application, an identification of a service, or an identifier of a daemon software process associated with the data source addition. In some embodiments, the determining the applicable traffic class includes estimating a data traffic pattern for the data source addition and selecting the applicable traffic class from a plurality of traffic classes based at least in part on the data traffic pattern. In some embodiments, the adjusting the wireless circuitry includes adjusting parameters that affect a periodicity and/or length of active time periods and sleep time periods in accordance with the applicable traffic class.

In some embodiments, a wireless communication includes: wireless circuitry configurable to support communication in accordance with one or more wireless communication protocols; and (processing circuitry including one or more processors and one or more memories storing computer-executable instructions that, when executed by the one or more processors, cause the wireless communication device to: (i) detect addition of a data source that generates and/or consumes data traffic; (ii) determine an applicable traffic class for the data source; and (iii) when the number of active data sources for the applicable traffic class before the addition is zero: increment the number of active data sources for the applicable traffic class, transfer a message that includes a traffic class state to communications circuitry, and adjust wireless circuitry based at least in part on the traffic class state and a traffic class policy.

In some embodiments, execution of the instructions further causes the wireless communication device to increment the number of active data sources for the applicable traffic class when the number of active data sources for the applicable traffic class before the addition is non-zero. In some embodiments, execution of the instructions further causes the wireless communication device to: (i) wait a delay period; (ii) determine whether the data source is deleted during the delay period; and (iii) only when the data source persists for the delay period: increment of the number of active data sources, transfer the message, and adjust the wireless circuitry. In some embodiments, the processing circuitry includes an applications processor and a communications processor, the applications processor determining the applicable traffic class and transferring the message including the traffic class state to the communications processor, and the communications processor adjusting the wireless circuitry. In some embodiments, the wireless communication device detects the addition of the data source by at least detecting an opening of a socket to establish a traffic flow. In some embodiments, the traffic class state includes an indicator bit value for each of a plurality of traffic classes, the indicator bit value indicating whether the number of active data sources for the associated traffic class is zero or non-zero. In some embodiments, the wireless communication device adjusts the wireless circuitry by at least modifying settings to improve performance and/or to reduce power consumption of the wireless communication device. In some embodiments, the wireless communication device adjusts the wireless circuitry by at least modifying one or more parameters for a connected discontinuous transmission/reception mode for communication via the wireless circuitry with a wireless network. In some embodiments, the wireless communication device determines the applicable traffic class by at least selecting the applicable traffic class from a plurality of traffic classes based at least in part on information obtained for the data source addition. In some embodiments, the information includes a name of an application, an identification of a service, or an identifier of a daemon software process associated with the data source addition. In some embodiments, the processing circuitry determines the applicable traffic class by at least estimating a data traffic pattern for the data source addition and selecting the applicable traffic class from a plurality of traffic classes based at least in part on the data traffic pattern.

In some embodiments, a non-transitory computer-readable medium stores instructions that, when executed by one or more processors of a wireless communication device, cause the wireless communication device to: (i) detect addition of a data source that generates and/or consumes data traffic; (ii) determine an applicable traffic class for the data source; and (iii) when the number of active data sources for the applicable traffic class before the addition is zero: increment the number of active data sources for the applicable traffic class, transfer a message that includes a traffic class state to communications circuitry, and adjust wireless circuitry based at least in part on the traffic class state and a traffic class policy.

In some embodiments, execution of the instructions stored in the non-transitory computer-readable medium further causes the wireless communication device to increment the number of active data sources for the applicable traffic class when the number of active data sources for the applicable traffic class before the addition is non-zero. In some embodiments, execution of the instructions stored in the non-transitory computer-readable medium further causes the wireless communication device to: (i) wait a delay period; (ii) determine whether the data source is deleted during the delay period; and (iii) only when the data source persists for the delay period: increment of the number of active data sources, transfer the message, and adjust the wireless circuitry.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

The various aspects, embodiments, implementations or features of the described embodiments can be used separately or in any combination. Various aspects of the described embodiments can be implemented by software, hardware, or a combination of hardware and software. The described embodiments can also be embodied as computer readable, computer-executable code on a computer readable medium. The computer readable medium is any data storage device that can store data, which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method to adjust wireless circuitry in a wireless communication device, the method comprising:
   detecting addition of a data source that communicates data traffic;
   determining an applicable traffic class for the data source; and
   when a number of active data sources for the applicable traffic class before the addition of the data source is zero:
   waiting a delay period,
   determining whether the data source is deleted during the delay period, and
   when the data source persists for the delay period:
   incrementing the number of active data sources for the applicable traffic class;
   transferring a message that includes a traffic class state to communications circuitry; and
   adjusting wireless circuitry based at least in part on the traffic class state and a traffic class policy.

2. The method of claim 1, wherein the detecting the addition of the data source comprises detecting an opening of a socket to establish a traffic flow.

3. The method of claim 1, wherein the traffic class state comprises an indicator bit value for each of a plurality of traffic classes, the indicator bit value indicating whether the number of active data sources for the associated traffic class is zero or non-zero.

4. The method of claim 3, wherein the traffic class policy indicates a prioritization of the traffic classes in the plurality of traffic classes.

5. The method of claim 1, wherein the adjusting the wireless circuitry comprises modifying settings to reduce power consumption of the wireless communication device.

6. The method of claim 1, wherein the adjusting the wireless circuitry comprises modifying one or more parameters for a connected discontinuous transmission/reception mode for communication via the wireless circuitry with a wireless network.

7. The method of claim 1, wherein the adjusting the wireless circuitry is further based at least in part on a device type of the wireless communication device.

8. The method of claim 1, wherein the adjusting the wireless circuitry is further based at least in part on a historical usage pattern for a user of the wireless communication device.

9. The method of claim 1, wherein the adjusting the wireless circuitry reduces power consumption of the wireless communication device by causing at least a portion of the wireless circuitry to enter a lower power state.

10. The method of claim 1, wherein the determining the applicable traffic class comprises selecting the applicable traffic class from a plurality of traffic classes based at least in part on information obtained for the data source addition.

11. The method of claim 10, wherein the information comprises a name of an application, an identification of a service, or an identifier of a daemon software process associated with the data source addition.

12. The method of claim 1, wherein the determining the applicable traffic class comprises estimating a data traffic pattern for the data source addition and selecting the applicable traffic class from a plurality of traffic classes based at least in part on the data traffic pattern.

13. The method of claim 12, wherein the adjusting the wireless circuitry comprises adjusting parameters that affect a periodicity and/or length of active time periods and sleep time periods in accordance with the applicable traffic class.

14. A wireless communication device comprising:
wireless circuitry configurable to support communication in accordance with one or more wireless communication protocols; and
processing circuitry including one or more processors and one or more memories storing computer-executable instructions that, when executed by the one or more processors, cause the wireless communication device to:
detect addition of a data source that communicates data traffic;
determine an applicable traffic class for the data source; and
when a number of active data sources for the applicable traffic class before the addition of the data source is zero:
wait a delay period,
determine whether the data source is deleted during the delay period, and
when the data source persists for the delay period:
increment the number of active data sources for the applicable traffic class;
transfer a message that includes a traffic class state to communications circuitry; and
adjust wireless circuitry based at least in part on the traffic class state and a traffic class policy.

15. The wireless communication device of claim 14, wherein the processing circuitry comprises an applications processor and a communications processor, the applications processor determining the applicable traffic class and transferring the message comprising the traffic class state to the communications processor, and the communications processor adjusting the wireless circuitry.

16. The wireless communication device of claim 14, wherein the wireless communication device detects the addition of the data source by at least detecting an opening of a socket to establish a traffic flow.

17. The wireless communication device of claim 14, wherein the traffic class state comprises an indicator bit value for each of a plurality of traffic classes, the indicator bit value indicating whether the number of active data sources for the associated traffic class is zero or non-zero.

18. A non-transitory computer-readable medium storing instructions that, when executed by one or more processors of a wireless communication device, cause the wireless communication device to:
detect addition of a data source that communicates data traffic;
determine an applicable traffic class for the data source;
when a number of active data sources for the applicable traffic class before the addition of the data source is zero:
wait a delay period,
determine whether the data source is deleted during the delay period, and
when the data source persists for the delay period:
increment the number of active data sources for the applicable traffic class;
transfer a message that includes a traffic class state to communications circuitry; and
adjust wireless circuitry based at least in part on the traffic class state and a traffic class policy.

* * * * *